(12) United States Patent
Kalos et al.

(10) Patent No.: US 7,117,118 B2
(45) Date of Patent: Oct. 3, 2006

(54) EFFICIENT ACCUMULATION OF PERFORMANCE STATISTICS IN A MULTI-PORT NETWORK

(75) Inventors: Matthew J. Kalos, Tucson, AZ (US);
Michael T. Benhase, Tucson, AZ (US);
James C. Chen, Tucson, AZ (US);
Patricia C. Lu, Freemont, CA (US)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 10/911,904

(22) Filed: Aug. 4, 2004

(65) Prior Publication Data

US 2006/0041664 A1    Feb. 23, 2006

(51) Int. Cl.
*G06F 15/00* (2006.01)
*G06F 17/18* (2006.01)
*G06F 19/00* (2006.01)

(52) U.S. Cl. .................. 702/179; 717/158; 370/477; 370/468

(58) Field of Classification Search ................ 702/179; 717/158; 370/477, 468
See application file for complete search history.

(56) References Cited

U.S. PATENT DOCUMENTS

| | | |
|---|---|---|
| 6,327,515 B1 | 12/2001 | Shea et al. |
| 6,596,030 B1 | 7/2003 | Ball et al. |
| 2001/0056485 A1 | 12/2001 | Barrett, Jr. |
| 2002/0110149 A1* | 8/2002 | Roberts et al. ............. 370/477 |
| 2002/0177910 A1 | 11/2002 | Quarterman |
| 2003/0018641 A1 | 1/2003 | Gotwals et al. |
| 2003/0018960 A1* | 1/2003 | Hacking et al. ............ 717/158 |
| 2003/0088579 A1 | 5/2003 | Brown et al. |
| 2003/0186651 A1 | 10/2003 | Weston et al. |

OTHER PUBLICATIONS

Browne et al. (1999) PAPI: Portable Interface to Hardware Performance Counters http://www.wes.hpc.mil/faq/tech_reports/reports/pdf/tr_9906.pdf.

\* cited by examiner

*Primary Examiner*—Bryan Bui
*Assistant Examiner*—Sujoy Kundu
(74) *Attorney, Agent, or Firm*—Dan Shifrin

(57) ABSTRACT

Computer networks are provided with a resource efficient ability to generate link performance statistics. Two counters accumulates the number of I/O operations processed by a link and the time required by the link to complete each I/O operation. The average link utilization per I/O operation may then be calculated. The number of operations per second for a link may be computed by dividing the output from the first counter by a predetermined period of time and the average number of operations using the link may be computed by dividing the output from the second counter by the predetermined period of time. An optional third counter may be employed to accumulate the number of bytes transferred by a link during each I/O operation and used to compute the average size of an I/O operation. The generated statistics are useful for such activities as problem resolution, load balancing and capacity planning.

5 Claims, 1 Drawing Sheet

EFFICIENT ACCUMULATION OF PERFORMANCE STATISTICS IN A MULTI-PORT NETWORK

TECHNICAL FIELD

The present invention relates generally to large computer networks and, in particular, to accumulating statistics related to the performance of links associated with ports connected to the network.

BACKGROUND ART

In large data network environments, it is important to be able to obtain statistics about the performance of input/output (I/O) operations on the physical network, such as the links which connected ports of different network devices. Statistics of interest can include the number of I/O operations a link can handle (in operations per second); the bandwidth of a link (in megabytes (MB) per second); the average number of concurrent operations using a link during a time period; the average transfer length (in MB/operation); and the average link utilization per operation (in microseconds/operation).

Such statistics may be used in real time to trigger fault procedures if a large variance from a normal value indicates the existence of a possible problem. Statistics may also kept in a log to be referenced during normal maintenance or problem resolution. Typically, statistics may be calculated by a network server, such as an Enterprise Storage Server® (ESS) sold by IBM® and may be maintained by one or more attached host devices. However, due to the large number of links between components in a network, collecting data and sampling the collected data to compute statistics can consume a large amount of valuable network resources. Consequently, it is desirable to provide for more efficient data collection and statistic generation.

Moreover, each device port may include more than one link type, such as ECKD™ (extended count key data), PPRC (peer-to-peer remote copy), and SCSI (small computer system interface). Consequently, it is desirable to generate statistics on a link type basis to provide a higher level of detail than generating statistics only by port.

SUMMARY OF THE INVENTION

The present invention provides computer networks with an ability to efficiently generate link performance statistics. To calculate the average link utilization per I/O operation, a first counter accumulates the number of I/O operations processed by a link and a second counter accumulates the time required by the link to complete each I/O operation. The second value is then divided by the first value. The number of operations per second for a link may be computed by dividing the first number by a predetermined period of time and the average number of operations using the link may be computed by dividing the second number by the predetermined period of time. A third counter may be employed to accumulate the number of bytes transferred by a link during each I/O operation. Then, the average size of an I/O operation may be computed by dividing the third number by the first number and the average bandwidth per link operation may be computed by dividing the third number by the predetermined period of time. Separate sets of counters are preferably associated with each of several link types associated with a single port, thereby allowing separate statistics to be generated for each link type. The generated statistics are useful for such activities as problem resolution, load balancing and capacity planning.

DETAILED DESCRIPTION OF THE PREFERRED EMBODIMENT

Figure 1:
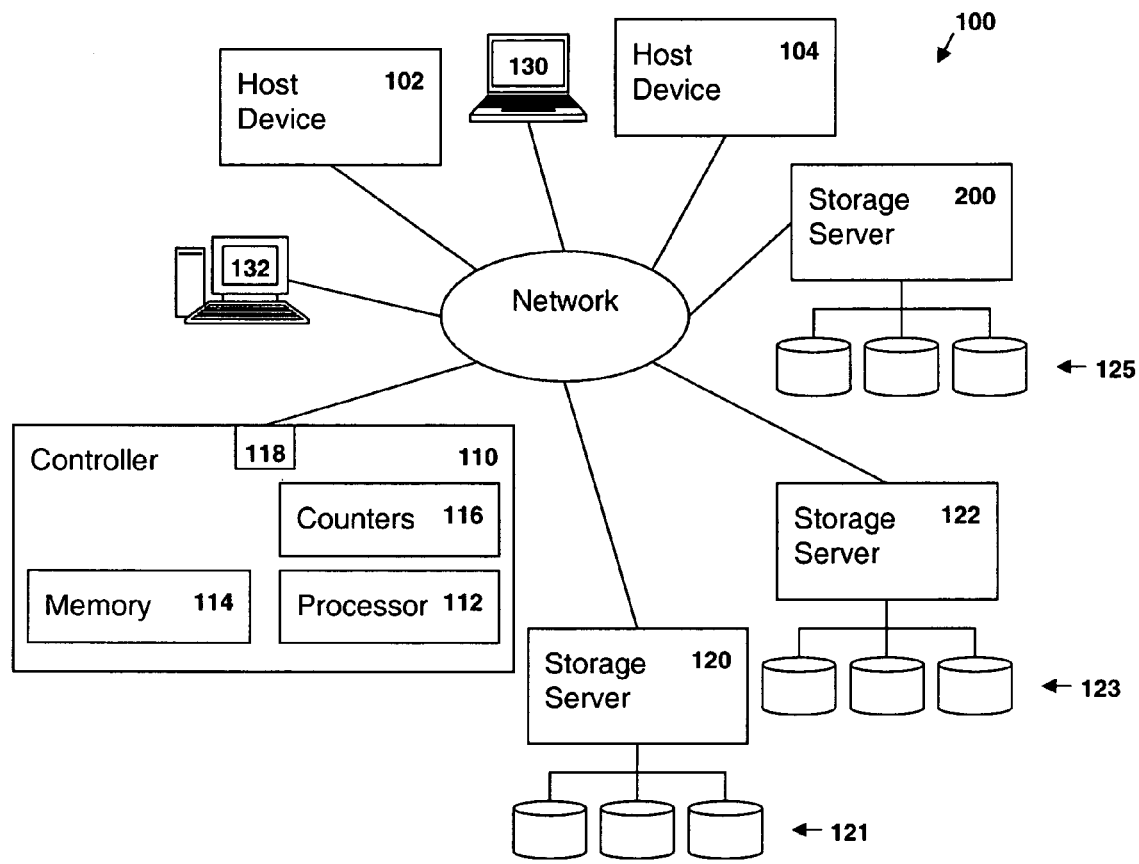
FIG. 1 is a block diagram of a data network in which the present invention may be implemented.

FIG. 1 is a block diagram of a data network 100 in which the present invention may be implemented. The network 100 includes one or more host devices 102 and 104, a controller or server 110 and other storage servers 120, 122, 200 with attached data storage devices 121, 123 and 125. Other devices 130 and 132 may also be attached to the network 100. The controller 110 may be an IBM Enterprise Storage Server and includes a processor 112, memory 114 and counters 116 as well as appropriate network interfaces 118. The processor 112 is programmed with instructions stored in the memory 114 for managing I/O operations requested by the host devices 102, 104 as well as for computing network I/O performance statistics. The storage devices 121, 123, 125 may be any type of removable or fixed physical storage including, without limitation, electronic memory (such as RAM or solid state memory), hard disks, RAID arrays, tape cartridges, optical discs and other media. Removable media may be (but need not be) contained with an automated data storage library. As will be appreciated, the counters 116 may be implemented in hardware or software.

Figure 2:
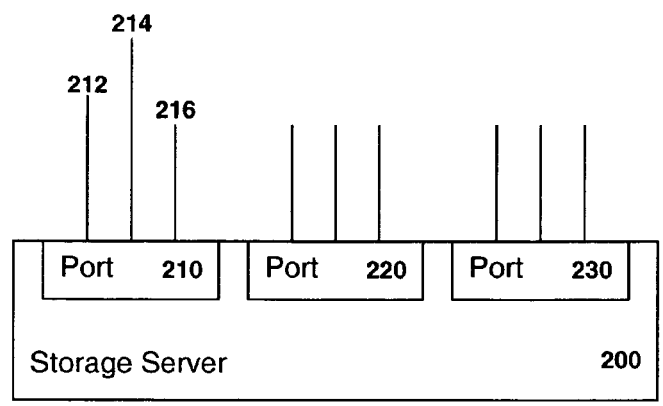
FIG. 2 is a block diagram of a multi-port, multi-link storage server.

FIG. 2 is a block diagram of the storage server 200. The storage server 200 includes one or more ports 210, 220, 230 and each port may accommodate one or more network links. For example, a port 210 may accommodate three link types such as ECKD 212, PPRC 214 and SCSI 216. Although shown separately in FIG. 2, data transmitted/received over different link types may actually travel over a single physical path to/from the network. Moreover, multiplexing permits all of the links of a port to be used essentially in a simultaneous manner.

For each link of each port, there are preferably three corresponding counters in the controller 110. A first counter provides an accumulated count of the number of I/O operations processed through the link. A second counter provides the accumulated utilization time (in microseconds or other appropriate unit of time) associated with each I/O operation. And, a third counter provides an accumulated bandwidth comprising the number of bytes transferred by each I/O operation through the link. The utilization time indicates how long a port processor is active with a particular I/O operation and is useful in determining the port's contribution to any delay. Using only the three counters for each port reduces the processing resources required for obtaining performance statistics. From the three counters, a variety of statistics may be computed.

Before statistics can be computed, the counters must be sampled. A time period Δ T is selected, such as by preprogramming the controller 110, by action of a host device, by a network administrator or by a maintenance technician. The time periods selected for each of the three counters are preferably the same. The time period selected should be long enough to provide meaningful values but not so long that a counter overflows and wraps around to 0 before the end of the period. The time period must also be selected according to the data rate of the link. For example, one user may wish to sample rapidly at the rate of approximately $\Delta T$ equals one second while another user may wish to sample more slowly at the rate of $\Delta T$ equals 30 minutes. Thus, the counters should be of sufficient size to allow for both one second sampling and 30 minute sampling without overflowing. A counter capacity of 128K allows for measurement of one second samples with link data rates as low as 128 KB/sec. while also allowing measurement of 30 minute samples with link data rates of 150 GB/sec. While larger counter capacities will accommodate longer sampling periods, larger counters require the use of more hardware. Four-byte counters have been found to accommodate a wide range of link data rates and sampling rates.

In operation, each counter is sampled first at the beginning of the selected time period and then at the end of the period, thereby providing a delta value for each. Initial and final readings of the first counter provide a count $\Delta A$ of the number of I/O operations processed through the link during the period $\Delta T$. Initial and final readings of the second counter provide the utilization time $\Delta B$ associated with I/O operations during the period $\Delta T$. And, initial and final readings of the bandwidth $\Delta C$ of the link during the period $\Delta T$. The statistics may then be computed by the controller 110:

Average link utilization per operation through the link equals $\Delta B/\Delta A$ I/O operations per second equals $\Delta A/\Delta T$;

Average number of concurrent operations using the link equals $\Delta B/\Delta T$;

Bandwidth in MB/sec equals $\Delta C/\Delta T$; and

Average bandwidth per operation through the link equals $\Delta C/\Delta A$.

If desired, separate counters may be included in the controller 110 to track read operation data separate from write operation data for each link, such as: number of read operations and of write operations; number of bytes read and bytes written; and the response time for read operations and for write operations.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A storage server, comprising:
    an interface for interconnecting the storage server to a multi-port data network, whereby information pertaining to I/O operations through links associated with the ports is received by the storage server;
    for each port in the network:
        a first counter for accumulating a number A of I/O operations processed by a link coupled to the port; and
        a second counter for accumulating a time B required by the link to complete each I/O operation;
    means for selecting a time period $\Delta T$ during which statistics are desired; and
    for each port in the network, means for calculating the average link utilization per operation $\Delta B/\Delta A$.

2. The storage server of claim 1, further comprising:
    for each port in the network, a third counter for accumulating a number C of bytes transferred during each I/O operation; and
    for each port in the network:
        means for calculating operations per second $\Delta A/\Delta T$, where $\Delta A$ equals the number of I/O operations processed by the link during the time period $\Delta T$;
        means for calculating average number of operations using the link $\Delta B/\Delta T$, where $\Delta B$ equals the time required by the link to complete each I/O operation during the time period $\Delta T$;
        means for calculating MB/sec $\Delta C/\Delta T$, where $\Delta C$ equals the number of bytes transferred during each I/O operation processed by the link during the time period $\Delta T$; and
        means for calculating the average bandwidth per operation $\Delta C/\Delta A$.

3. The storage server of claim 1, wherein:
    a plurality of link types are associated with each of at least two ports in the network; and
    the means for accumulating and calculating comprise means for accumulating and calculating for each link associated with each port.

4. The storage server of claim 1, wherein the link types are selected from the group comprising ECKD links, PPRC links and SCSI links.

5. The storage server of claim 1, further comprising a host interface through which results generated by each means for calculating are transmitted to a host device coupled to the network.

* * * * *